(12) United States Patent
Perego et al.

(10) Patent No.: US 11,525,050 B2
(45) Date of Patent: Dec. 13, 2022

(54) POLYMER COMPOSITION WITH IMPROVED STRESS WHITENING RESISTANCE

(71) Applicant: NEXANS, Courbevoie (FR)

(72) Inventors: Gabriele Perego, Milan (IT); Christelle Mazel, Ruy (FR); Matthias Meyer, Luebeck (DE); Dimitri Charrier, Ecully (FR); Xavier Festaz, Villieu-Loyes-Mollon (FR)

(73) Assignee: NEXANS, Courbevoie (FR)

( * ) Notice: Subject to any disclaimer, the term of this patent is extended or adjusted under 35 U.S.C. 154(b) by 654 days.

(21) Appl. No.: 16/062,416

(22) PCT Filed: Dec. 15, 2016

(86) PCT No.: PCT/FR2016/053480
§ 371 (c)(1),
(2) Date: Jun. 14, 2018

(87) PCT Pub. No.: WO2017/103511
PCT Pub. Date: Jun. 22, 2017

(65) Prior Publication Data
US 2020/0277477 A1    Sep. 3, 2020

(30) Foreign Application Priority Data

Dec. 18, 2015    (FR) ..................... 15 62790

(51) Int. Cl.
C08L 23/12    (2006.01)
C08K 5/01    (2006.01)
(Continued)

(52) U.S. Cl.
CPC ............. *C08L 23/12* (2013.01); *H01B 3/441* (2013.01); *C08K 5/01* (2013.01); *C08L 2201/08* (2013.01);
(Continued)

(58) Field of Classification Search
None
See application file for complete search history.

(56) References Cited

U.S. PATENT DOCUMENTS 6,124,770 A    9/2000    Sakamoto
2003/0233604 A1    12/2003    Lin et al.
(Continued)

FOREIGN PATENT DOCUMENTS

CN    103102592    5/2013
CN    104448543    3/2015
(Continued)

OTHER PUBLICATIONS

Chinese Office Action dated Jun. 23, 2020.
International Search Report dated Feb. 10, 2017.
Australian Office Action dated Dec. 15, 2020.

*Primary Examiner* — Richard A Huhn
(74) *Attorney, Agent, or Firm* — Sofer & Haroun, LLP

(57) ABSTRACT

A polymer composition is provided with improved stress whitening resistance, having at least one thermoplastic polymer material and a dielectric liquid. A process for preparing the polymer composition, a cable having at least one electrically insulating layer obtained from the polymer composition, and a process for preparing the cable are also provided.

17 Claims, 1 Drawing Sheet

(51) Int. Cl.
*H01B 3/44* (2006.01)
*H01B 9/02* (2006.01)

(52) U.S. Cl.
CPC ..... *C08L 2205/03* (2013.01); *C08L 2207/066* (2013.01); *C08L 2666/30* (2013.01); *H01B 9/027* (2013.01)

(56) References Cited

U.S. PATENT DOCUMENTS

| | | |
|---|---|---|
| 2006/0100466 A1 | 5/2006 | Holmes |
| 2006/0124341 A1 | 6/2006 | Perego |
| 2011/0152412 A1* | 6/2011 | Hogt .................. C08K 5/34924 524/101 |
| 2013/0002590 A1 | 1/2013 | Gabriele Perego |
| 2013/0233604 A1 | 9/2013 | Perego |
| 2014/0190723 A1* | 7/2014 | Vestberg .................. H01B 9/00 174/110 SR |

FOREIGN PATENT DOCUMENTS

| | | |
|---|---|---|
| FR | 2111059 A5 * | 6/1972 |
| FR | 2111059 A5 | 6/1972 |
| JP | 2003160705 | 6/2003 |

* cited by examiner

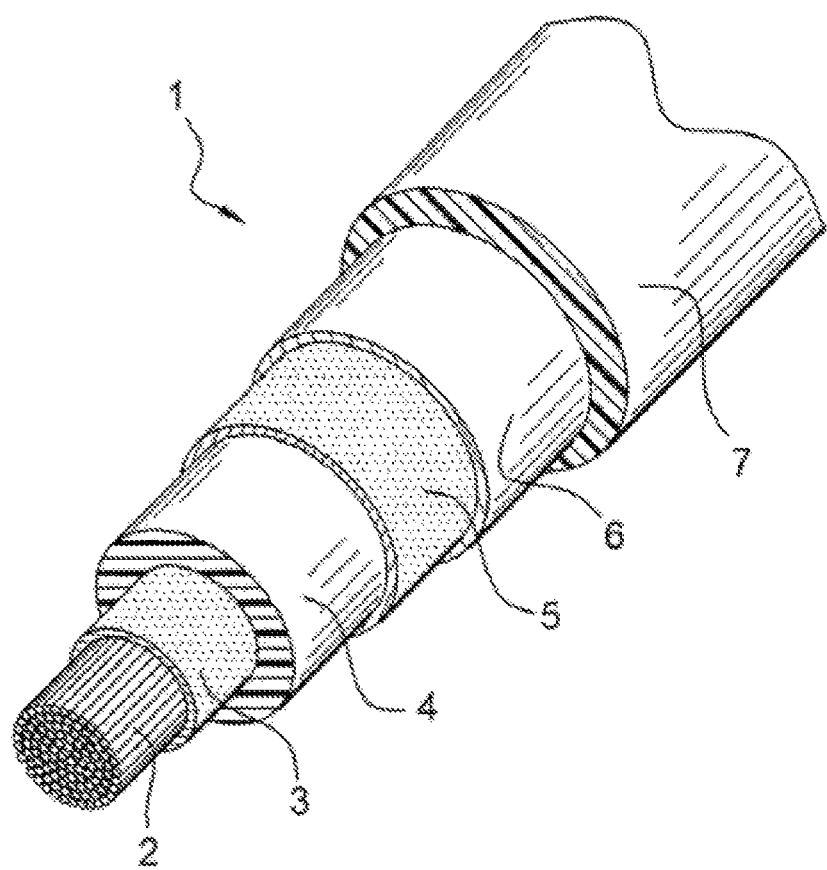

POLYMER COMPOSITION WITH IMPROVED STRESS WHITENING RESISTANCE

RELATED APPLICATIONS

This application is a National Phase Application of PCT/FR2016/053480 filed on Dec. 15, 2016, which in turn claims the benefit of French Patent Application No. 15 62790 filed on Dec. 18, 2015.

BACKGROUND

Field of the Invention

The invention relates to a polymer composition with improved stress whitening resistance, comprising at least one thermoplastic polymer material and a dielectric liquid, to a process for preparing said polymer composition, to a cable comprising at least one electrically insulating layer obtained from said polymer composition, and to a process for preparing said cable.

The invention applies typically, but not exclusively, to electric cables intended for power transmission, especially medium-voltage power cables (especially from 6 to 45-60 kV) or high-voltage power cables (especially above 60 kV, and which may be up to 400 kV), whether for DC or AC current, in the fields of submarine or terrestrial electricity transmission.

Description of Related Art

A medium-voltage or high-voltage power transmission cable generally comprises, from the interior to the exterior:
- an elongated electrically conducting element, especially made of copper or aluminium;
- a semi-conducting internal layer surrounding said elongated electrically conducting element;
- an electrically insulating layer surrounding said semi-conducting internal layer;
- a semi-conducting external layer surrounding said insulating layer; and
- optionally, an electrically insulating protective sheath surrounding said semi-conducting external layer.

In this type of cable, the electrically insulating layer may be a polymer layer based on a crosslinked polyethylene (XLPE). The crosslinking is generally performed during the step of extrusion of the polymer composition around the elongated electrically conducting element. The use of a crosslinked polyolefin provides a cable which can function at a temperature above 70° C., or even equal to 90° C. However, several problems are encountered. Firstly, crosslinked materials cannot be recycled. Secondly, crosslinking (vulcanization) to produce a homogeneous layer requires specific reaction conditions (e.g. in terms of duration and temperature) which reduce the rate of manufacture of the cable and increase its production cost. Finally, crosslinking may occasionally start prematurely in the extruder and/or the extruder head, leading to degradation of the quality of the layer obtained, especially of its dielectric properties.

Alternatives have thus been proposed, such as a thermoplastic layer of low-density polyethylene (LDPE) or of high-density polyethylene (HDPE). However, a cable comprising such an electrically insulating layer cannot function at a temperature above about 70° C. for an LDPE thermoplastic layer and above 80° C. for an HDPE thermoplastic layer, leading to a limitation of the power that can be transmitted in said cable and of the manufacturing methods.

Electrically insulating layers based on polypropylene (e.g. heterophasic propylene copolymer) have been proposed. However, these layers withstand stress whitening with difficulty. Thus, when these polymers are bent and/or receive impacts, the bent area and/or the area which has received an impact becomes opaque and whitish even when the polymer is coloured. This phenomenon may occur, for example, during rolling-up at the time of installation of a cable. Now, stress whitening is not desired since it increases the risk of cracking and/or leads to the formation of defects in the layer, bringing about degradation of the electrical properties of said layer.

OBJECTS AND SUMMARY

It is known practice to improve the stress whitening resistance by adding polyethylene. In particular, EP 1 510 547 A1 describes a polymer composition comprising from 70% to 98% by mass of a heterophasic propylene copolymer comprising one phase based on a propylene homopolymer and one phase based on a copolymer of propylene and of ethylene and/or of one or more $C_4$-$C_{12}$ α-olefins and from 2% to 30% by mass of an ethylene polymer. However, this polymer composition is not optimized in terms of stress whitening resistance and of dielectric breakdown strength to be used in an electrically insulating layer of a medium-voltage or high-voltage cable.

Thus, the aim of the present invention is to overcome the drawbacks of the prior art and to provide an economical polymer composition using recyclable materials, which can give an electrically insulating layer that has improved mechanical properties, especially in terms of stress whitening resistance, while at the same time ensuring good dielectric properties, especially in terms of dielectric breakdown strength.

The aim of the present invention is also to provide an economical cable, in particular a medium-voltage or high-voltage cable, which can function at temperatures above 70° C. and which has improved mechanical properties, especially in terms of stress whitening resistance, while at the same time ensuring good dielectric properties, especially in terms of dielectric breakdown strength.

The aims are achieved by the invention which will be described hereinbelow.

A first subject of the invention is a polymer composition comprising at least one polypropylene-based thermoplastic polymer material and a dielectric liquid, characterized in that the dielectric liquid comprises at least one compound corresponding to formula (I) below:

$$R^1\text{-}A\text{-}R^2 \qquad (I)$$

in which $R^1$ and $R^2$, identical or different, are unsubstituted aryl groups and the element A represents a single bond or an alkylene group.

The aryl group may comprise one or more fused or non-fused, and preferably non-fused, aromatic rings.

The aryl group may comprise from 5 to 20 carbon atoms and preferably from 6 to 12 carbon atoms.

Each aromatic ring may comprise one or more heteroatoms such as a nitrogen atom, a sulfur atom or an oxygen atom.

The expression "unsubstituted aryl groups" means that each of the aryl groups of the compound of formula (I) does not comprise any monovalent substituent(s), and especially is not substituted with one or more alkyl groups of formula $C_tH_{2t+1}$ (e.g. $1 \leq t \leq 5$) such as methyl groups.

The aryl groups of the compound of formula (I) are therefore not alkyl-aryl groups.

The element A may be a linear, cyclic or branched, preferably linear or cyclic and more preferably linear alkylene group.

In particular, the element A may be an alkylene group containing from 1 to 10 carbon atoms and preferably from 1 to 5 carbon atoms.

Preferably, the alkylene group is a group —$(CH_2)_n$— with $1 \leq n \leq 10$; a group —$(CHR)_{n'}$— with $1 \leq n' \leq 5$ and R being an alkyl group, preferably containing from 1 to 5 carbon atoms; a statistical group —$(CHR)_p$—$(CH_2)_m$— (i.e. comprising m —$CH_2$— and p —CHR—), with $1 \leq p+m \leq 9$, and R being an alkyl group, preferably containing from 1 to 5 carbon atoms; or a statistical group —$(CHR)_{p1}$—$(CH_2)_{m'}$—$(CHR')_{p2}$— (i.e. comprising m —$CH_2$—, $p_1$ —CHR— and $p_2$ —CHR'—), with $1 \leq p_1+m'+p_2 \leq 8$, and R and R' being different alkyl groups, each preferably containing from 1 to 5 carbon atoms, preferably with $1 \leq p \leq 4$, $1 \leq m \leq 8$, $1 \leq p_1 \leq 3$, $1 \leq m' \leq 6$ and $1 \leq p_2 \leq 3$.

In the present invention, a statistical group means that the radicals which constitute it (e.g. —$CH_2$—, —CHR— and/or —CHR'—) may be randomly positioned in the element A.

R (or, respectively, R') may be a methyl, ethyl, propyl or isopropyl group.

When the element A (connecting the aryl groups) is a branched alkylene group (e.g. presence of at least either of the groups R and R'), it may also be connected by branching (e.g. via R or R') to $R^1$ and/or $R^2$.

The aryl group is preferably a phenyl group, a naphthyl group or a pyridyl group, and more preferably a phenyl group.

According to a first variant of the invention, at least one of said groups $R^1$ or $R^2$ of the compound of formula (I) is a phenyl group.

According to a second variant of the invention, the two aryl groups each comprise a phenyl group.

According to a third variant, the groups $R^1$ and $R^2$ of the compound of formula (I) are each phenyl groups.

According to a particularly preferred embodiment of the invention, the compound of formula (I) may be 1,2-diphenylethane (i.e. $R^1=R^2$=phenyl and A=—$CH_2$—$CH_2$—), 1,1-diphenylethane (i.e. $R^1=R^2$=phenyl and A=—$CH(CH_3)$—), diphenylmethane (i.e. $R^1=R^2$=phenyl and A=—$CH_2$—) or 1,2,3,4-tetrahydro(1-phenylethyl)naphthalene (i.e. $R^1=R^2$=phenyl and A=—$CHCH_3$—CH—$(CH_2)_3$—).

The dielectric liquid is generally liquid at about 20-25° C.

The dielectric liquid may comprise at least 50% by mass approximately of at least one compound of formula (I), and preferably at least 80% by mass approximately of at least one compound of formula (I), relative to the total mass of the dielectric liquid. By means of this minimum amount of compound(s) (I), the stress whitening resistance is improved.

Preferably, the dielectric liquid is constituted solely of a compound of formula (I) or of several compounds of formula (I).

The ratio of the number of aromatic carbon atoms to the total number of carbon atoms in the dielectric liquid may be greater than or equal to about 0.6; and preferably greater than about 0.6.

The ratio of the number of aromatic carbon atoms to the total number of carbon atoms in the dielectric liquid may be determined according to standard ASTM D3238 or on the basis of the chemical formula.

The presence of a compound of formula (I) in the polymer composition makes it possible to improve the stress whitening resistance of the electrically insulating layer of an electric cable, while at the same time ensuring good dielectric breakdown strength. Moreover, the presence of a polypropylene-based thermoplastic polymer material makes it possible to increase the operating temperature of the cable to 90° C.-110° C.

Preferably, the dielectric liquid has a boiling point of greater than about 250° C.

Thus, the dielectric liquid of the polymer composition of the invention may be manipulated without risk at room temperature (sparingly volatile) and at the temperatures required by the process for forming the electrically insulating layer (e.g. extrusion), while at the same time ensuring the formation of a homogeneous intimate mixture with the polymer material of the polymer composition of the invention.

The polypropylene-based thermoplastic polymer material may comprise at least one homopolymer or one copolymer of propylene ($P_1$), and optionally at least one homopolymer or one copolymer of α-olefin ($P_2$).

The combination of polymers $P_1$ and $P_2$ makes it possible to obtain a thermoplastic polymer material with good mechanical properties, especially in terms of elastic modulus, and good electrical properties.

In particular, the propylene copolymer $P_1$ may be a statistical propylene copolymer.

Examples of propylene copolymers $P_1$ that may be mentioned include copolymers of propylene and of olefin, the olefin being chosen especially from ethylene and an α-olefin other than propylene.

The α-olefin other than propylene may correspond to the formula $CH_2$=CH—$R^3$ in which $R^3$ is a linear or branched alkyl group containing from 2 to 10 carbon atoms, and may be chosen especially from the following olefins: 1-butene, 1-pentene; 4-methyl-1-pentene, 1-hexene, 1-octene, 1-decene, 1-dodecene, and a mixture thereof.

The olefin of the copolymer of propylene and olefin preferably represents not more than 15 mol % and more preferably not more than 10 mol % of the copolymer.

The copolymers of propylene and ethylene are preferred as propylene copolymer $P_1$.

The propylene copolymer $P_1$ preferably has an elastic modulus ranging from about 600 to 1200 MPa.

The propylene homopolymer $P_1$ preferably has an elastic modulus ranging from about 1250 to 1600 MPa.

The propylene homopolymer or copolymer $P_1$ may have a melting point of greater than about 130° C., preferably greater than about 140° C., and more preferably ranging from about 140 to 165° C.

In particular, the propylene homopolymer $P_1$ may have a melting point of about 165° C. and the propylene copolymer $P_1$ may have a melting point ranging from about 140 to 150° C.

The propylene homopolymer or copolymer $P_1$ may have a heat of fusion ranging from about 30 to 100 J/g.

In particular, the propylene homopolymer $P_1$ may have a heat of fusion ranging from about 80 to 90 J/g and the propylene copolymer $P_1$ may have a heat of fusion ranging from about 30 to 70 J/g.

The propylene homopolymer or copolymer $P_1$ may have a melt flow index ranging from 0.5 to 3 g/10 minutes, measured at about 230° C. with an approximately 2.16 kg load according to standard ASTM D1238-00.

According to a preferred embodiment of the invention, the propylene homopolymer or copolymer $P_1$ represents from about 40% to 70% by mass of the polypropylene-based thermoplastic polymer material.

The α-olefin of the α-olefin homopolymer or copolymer $P_2$ may correspond to the formula $CH_2=CH—R^4$ in which $R^4$ is a hydrogen atom or a linear or branched alkyl group containing from 1 to 12 carbon atoms, and may be chosen especially from the following olefins: ethylene, propylene, 1-butene, isobutylene, 1-pentene, 4-methyl-1-pentene, 1-hexene, 1-octene, 1-decene, 1-dodecene, and a mixture thereof.

The α-olefin propylene, 1-hexene or 1-octene is preferred.

The α-olefin homopolymer or copolymer $P_2$ may be a heterophasic copolymer comprising a thermoplastic phase of propylene type and a thermoplastic elastomer phase of the type copolymer of ethylene and of an α-olefin, a polyethylene or a mixture thereof.

The thermoplastic elastomer phase of the heterophasic copolymer may represent at least 20% by mass approximately, and preferably at least 45% by mass approximately, relative to the total mass of the heterophasic copolymer.

The α-olefin of the thermoplastic elastomer phase of the heterophasic copolymer may be propylene.

The polyethylene may be a linear low-density polyethylene. In the present invention, the term "low-density polyethylene" means a linear polyethylene with a density ranging from about 0.91 to 0.925.

According to a preferred embodiment of the invention, the α-olefin homopolymer or copolymer $P_2$ represents from about 30% to 60% by mass of the polypropylene-based thermoplastic polymer material.

The thermoplastic polymer material of the polymer composition of the invention is preferably heterophasic (i.e. it comprises several phases). The presence of several phases generally originates from the mixing of two different polyolefins, such as a mixture of polypropylene and of a copolymer of propylene or of polyethylene.

According to a particularly preferred embodiment of the invention, the thermoplastic polymer material comprises a copolymer of propylene and ethylene [as propylene homopolymer or copolymer $P_1$] and a heterophasic copolymer comprising a thermoplastic phase of propylene type and a thermoplastic elastomer phase of the type such as a copolymer of ethylene and propylene [as α-olefin homopolymer or copolymer $P_2$].

The polymer composition of the invention comprises an intimate mixture of the dielectric liquid and of the thermoplastic polymer material (e.g. it forms a homogeneous phase).

The mass concentration of the dielectric liquid in the polymer composition is preferably less than or equal to the saturation mass concentration of said dielectric liquid in the thermoplastic polymer material.

The saturation mass concentration at 20-25° C. is generally from about 15% to 20%. It may be determined by the liquid absorption method. In particular, plates (e.g. 200 mm×200 mm×0.5 mm in size) made of the polypropylene-based thermoplastic polymer material of the polymer composition are prepared from the corresponding starting materials, especially by moulding. Samples of these plates are weighed (initial weight=$P_0$) and then immersed at about 20° C. into the dielectric liquid of the polymer composition. The saturation mass concentration is measured by determining the weight change (as a percentage) of the samples after various immersion times (e.g. 3, 6, 9, 12 and 15 days) and after the surface thereof has been cleaned and dried (final weight=$P_f$). The absorption of the dielectric liquid is determined according to the following formula:

% absorption of dielectric liquid=$[(P_f-P_0)/P_0]\times100$

The saturation concentration is reached when $P_f$ shows a variation of less than 1% relative to the total weight increase which corresponds to $P_f-P_0$.

According to a particular embodiment, the dielectric liquid represents from about 1% to 20% by mass, preferably from about 2% to 15% by mass and more preferably from about 3% to 12% by mass relative to the total mass of the polymer composition.

According to a particular embodiment, the polypropylene-based thermoplastic polymer material represents from about 70% to 98% by mass, preferably from about 80% to 95% by mass and more preferably from about 88% to 97% by mass relative to the total mass of the polymer composition.

The polymer composition may also comprise one or more additives.

The additives are well known to those skilled in the art and may be chosen from antioxidants, UV stabilizers, copper scavengers, water treeing inhibitors, and a mixture thereof.

The polymer composition of the invention may typically comprise from about 0.01% to 5% by mass and preferably from about 0.1% to 2% by mass of additives relative to the total mass of the polymer composition.

More particularly, the antioxidants protect the polymer composition against the thermal stresses generated during the steps for manufacturing the cable or during the functioning of the cable.

The antioxidants are preferably chosen from hindered phenols, thio esters, sulfur-based antioxidants, phosphorus-based antioxidants, antioxidants of amine type, and a mixture thereof.

Examples of hindered phenols that may be mentioned include pentaerythrityl tetrakis(3-(3,5-di-tert-butyl-4-hydroxyphenyl)propionate) (Irganox® 1010), octadecyl 3-(3, 5-di-tert-butyl-4-hydroxyphenyl)propionate (Irganox® 1076), 1,3,5-trimethyl-2,4,6-tris(3,5-di-tert-butyl-4-hydroxybenzyl)benzene (Irganox® 1330), 4,6-bis(octylthiomethyl)-o-cresol (Irgastab® KV10), 2,2'-thiobis(6-tert-butyl-4-methylphenol) (Irganox® 1081), 2,2'-thiodiethylenebis[3-(3,5-di-tert-butyl-4-hydroxyphenyl) propionate] (Irganox® 1035), 2,2'-methylenebis(6-tert-butyl-4-methylphenol), 1,2-bis(3,5-di-tert-butyl-4-hydroxyhydrocinnamoyl)hydrazine (Irganox® MD 1024) and 2,2'-oxamidobis(ethyl 3-(3,5-di-tert-butyl-4-hydroxyphenyl) propionate).

Examples of thio esters that may be mentioned include didodecyl 3,3'-thiodipropionate (Irganox® PS800), distearyl thiodipropionate (Irganox® PS802) and 4,6-bis(octylthiomethyl)-o-cresol (Irganox® 1520).

Examples of sulfur-based antioxidants that may be mentioned include dioctadecyl 3,3'-thiodipropionate and didodecyl 3,3'-thiodipropionate.

Examples of phosphorus-based antioxidants that may be mentioned include tris(2,4-di-tert-butylphenyl) phosphite (Irgafos® 168) and bis(2,4-di-tert-butylphenyl)pentaerythrityl diphosphite (Ultranox® 626).

Examples of antioxidants of amine type that may be mentioned include phenylenediamines (e.g. 1PPD or 6PPD), diphenylaminestyrenes, diphenylamines, mercaptobenzimidazoles and polymerized 2,2,4-trimethyl-1,2 dihydroquinoline (TMQ).

An example of a mixture of antioxidants that may be mentioned is Irganox B 225, which comprises an equimolar mixture of Irgafos 168 and Irganox 1010 as described above.

The polymer composition is a thermoplastic polymer composition.

It is thus not crosslinkable.

In particular, the polymer composition does not comprise any crosslinking agents, silane-type coupling agents, peroxides and/or additives that enable crosslinking. The reason for this is that such agents degrade the polypropylene-based thermoplastic polymer material.

The polymer composition is preferably recyclable.

A second subject of the invention is a process for preparing the polymer composition in accordance with the first subject, characterized in that it comprises at least one step i) of mixing a polypropylene-based thermoplastic polymer material with a dielectric liquid as defined in the first subject of the invention.

In particular, the mixing is performed according to the following substeps:

i-a) optionally, mixing a compound of formula (I) as defined in the first subject of the invention with the additive(s) as defined in the first subject of the invention, and i-b) mixing a polypropylene-based thermoplastic polymer material as defined in the first subject of the invention with at least one compound of formula (I) or with the mixture as obtained in the preceding substep i-a) if substep i-a) exists.

The polypropylene-based thermoplastic polymer material of substep i-b) is generally in the form of polymer granules, especially of granules of at least one propylene homopolymer or copolymer $P_1$ and optionally of at least one α-olefin homopolymer or copolymer $P_2$ as defined in the first subject of the invention.

The mixing of substep i-a) may be performed using any machine for dissolving the additive(s) as defined in the first subject of the invention (especially when they are in the form of solid powders), at least in the compound of formula (I) of the dielectric liquid.

Substep i-a) is preferably performed at a temperature ranging from about 20 to 100° C., preferably from about 50 to 90° C. and more preferably at a temperature of about 70° C.

Substep i-a) generally lasts from 15 minutes to 1 hour and preferably from 20 to 30 minutes.

On conclusion of substep i-a), a stable, transparent solution is obtained.

The mixing of substep i-b) may be performed by mixing the mixture obtained in substep i-a) with the polypropylene-based thermoplastic polymer material or the polymeric compounds which constitute it, especially using an internal mixer, especially with tangential rotors or with gear rotors, or a continuous mixer, especially a screw or counter-rotating twin-screw mixer or a mixer of "Buss extruder" type.

In the course of substep i-b), the polymer composition of the invention may be formed, especially in the form of granules.

To do this, the temperature in the mixer is chosen to be sufficient to obtain the thermoplastic polymer material in melt form. Next, the homogeneous mixture may be granulated, via techniques that are well known to those skilled in the art. These granules can then feed an extruder to manufacture the cable of the invention according to a process as defined below.

A third subject of the invention is a cable comprising at least one elongated electrically conducting element, and at least one electrically insulating layer obtained from a polymer composition as defined in the first subject of the invention.

The electrically insulating layer of the invention is a non-crosslinked layer.

The electrically insulating layer of the invention is preferably a recyclable layer.

The electrically insulating layer of the invention may be an extruded layer, in particular extruded via processes that are well known to those skilled in the art.

In the present invention, the term "electrically insulating layer" means a layer whose electrical conductivity may be not more than $1 \times 10^{-9}$ S/m and preferably not more than $1 \times 10^{-9}$ S/m (Siemens per metre) (at 25° C.).

The cable of the invention more particularly relates to the field of electric cables functioning with direct current (DC) or alternating current (AC).

The electrically insulating layer of the invention may surround the elongated electrically conducting element.

The elongated electrically conducting element may be a mono-core conductor, for instance a metal wire, or a multi-core conductor such as a plurality of optionally twisted metal wires.

The elongated electrically conducting element may be made of aluminium, of aluminium alloy, of copper, of copper alloy, and of a combination thereof.

According to a preferred embodiment of the invention, the electric cable may comprise:

a first semi-conducting layer surrounding the elongated electrically conducting element, an electrically insulating layer surrounding the first semi-conducting layer, said electrically insulating layer being as defined in the invention, and a second semi-conducting layer surrounding the electrically insulating layer.

In the present invention, the term "semi-conducting layer" means a layer whose electrical conductivity may be at least $1 \times 10^{-9}$ S/m (Siemens per metre), preferably at least $1 \times 10^{-3}$ S/m, and may preferably be less than $1 \times 10^{3}$ S/m (at 25° C.).

In a particular embodiment, the first semi-conducting layer, the electrically insulating layer and the second semi-conducting layer constitute a three-layer insulation. In other words, the electrically insulating layer is in direct physical contact with the first semi-conducting layer, and the second semi-conducting layer is in direct physical contact with the electrically insulating layer.

The cable may also comprise an electrically insulating sheath surrounding the second semi-conducting layer, and may be in direct physical contact therewith.

The electric cable may also comprise a metal shield surrounding the second semi-conducting layer. In this case, the electrically insulating sheath surrounds said metal shield.

This metal shield may be a "wire" shield composed of an assembly of copper or aluminium conductors arranged around and along the second semi-conducting layer, a "strip" shield composed of one or more conductive metal strips made of copper or aluminium optionally posed helically around the second semi-conducting layer or a conductive metal strip made of aluminium posed longitudinally around the second semi-conducting layer and rendered leaktight by means of the adhesive in the overlap areas of parts of said strip, or a "leaktight" shield of metal tube type optionally composed of lead or lead alloy and surrounding the second semi-conducting layer. This last type of shield can especially act as a barrier to moisture which has a tendency to penetrate radially into the electric cable.

The metal shield of the electric cable of the invention may comprise a "wire" shield and a "leaktight" shield or a "wire" shield and a "strip" shield.

All the types of metal shields may act as earth for the electric cable and may thus transport fault currents, for example in the case of a short circuit in the network concerned.

Other layers, such as layers which swell in the presence of moisture, may be added between the second semi-conducting layer and the metal shield, these layers ensuring the longitudinal waterproofing of the electric cable.

A fourth subject of the invention is a process for manufacturing an electric cable in accordance with the third subject of the invention, characterized in that it comprises at least one step 1) of extrusion of the polymer composition in accordance with the first subject of the invention around an elongated electrically conducting element, to obtain an (extruded) electrically insulating layer surrounding said elongated electrically conducting element.

Step 1) may be performed via techniques that are well known to those skilled in the art, for example using an extruder.

During step 1), the composition leaving the extruder is said to be "non-crosslinked", the operating temperature and time in the extruder being optimized in consequence.

A layer extruded around said electrically conducting element, which may or may not be in direct physical contact with said elongated electrically conducting element, is thus obtained at the extruder outlet.

The process preferably does not comprise a step of crosslinking of the layer obtained in step 1).

BRIEF DESCRIPTION OF THE DRAWINGS

FIG. 1 is a schematic view of an electric cable according to a preferred embodiment in accordance with the invention.

For the sake of clarity, only the elements essential to the understanding of the invention have been represented schematically, and are not to scale.

DETAILED DESCRIPTION

The medium-voltage or high-voltage power cable 1, illustrated in FIG. 1, comprises a central elongated electrically conducting element 2, especially made of copper or aluminium. The power cable 1 also comprises several layers arranged successively and coaxially around this central elongated electrically conducting element 2, namely: a first semi-conducting layer 3 known as the "internal semi-conducting layer", an electrically insulating layer 4, a second semi-conducting layer 5 known as the "external semi-conducting layer", an earthing and/or protective metal shield 6, and a protective outer sheath 7.

The electrically insulating layer 4 is a non-crosslinked extruded layer, obtained from the polymer composition according to the invention.

The semi-conducting layers 3 and 5 are thermoplastic (i.e. non-crosslinked) extruded layers.

The presence of the metal shield 6 and of the outer protective sheath 7 is preferentially, but not essentially, this cable structure being well known per se to those skilled in the art.

EXAMPLES

1. Polymer Compositions

Table 1 below collates polymer compositions in which the amounts of the compounds are expressed as weight percentages relative to the total weight of the polymer composition.

Composition C1 is a comparative composition, and composition I1 is in accordance with the invention.

TABLE 1

| Polymer compositions | C1 | I1 | I2 |
|---|---|---|---|
| Propylene copolymer | 50.00 | 50.00 | 50.00 |
| Linear low-density polyethylene | 25.00 | 25.00 | 50.00 |
| Heterophasic propylene copolymer | 25.00 | 25.00 | 0 |
| 1,2,3,4-Tetrahydro(1-phenylethyl)naphthalene | 0 | 7.70 | 7.70 |
| Antioxidant | 0.3 | 0.3 | 0.3 |

The origin of the compounds in table 1 is as follows:
statistical propylene copolymer sold by the company Borealis under the reference Bormed RB 845 MO;
linear low-density polyethylene sold by the company ExxonMobil Chemicals under the reference LLDPE LL 1002 YB;
heterophasic copolymer sold by the company Basell Polyolefins under the reference Adflex Q 200F;
dielectric liquid constituted of 1,2,3,4-tetrahydro(1-phenylethyl)naphthalene sold by the company Dow under the reference Dowtherm RP; and
antioxidant sold by the company Ciba under the reference Irganox B 225, which comprises an equimolar mixture of Irgafos 168 and Irganox 1010.

2. Preparation of the Non-Crosslinked Layers

The compositions collated in table 1 are used as follows.

130 g of dielectric liquid and 5 g of antioxidant were mixed in a glass container with stirring.

The resulting mixture was subsequently mixed with 850 g of propylene copolymer, 425 g of linear low-density polyethylene and 425 g of heterophasic copolymer in a container, and the resulting polymer composition was then extruded using a twin-screw extruder (Berstorff twin screw extruder) at a temperature of about 200° C.

A comparative layer not in accordance with the invention was prepared as described above, but solely using the mixture of polymers and of oxidant.

3. Characterization of the Non-Crosslinked Layers

The stress whitening resistance was evaluated manually by bending two layers as prepared above from compositions C1 and I1, respectively.

The dielectric breakdown strength of the layers was measured using a device comprising two stainless-steel hemispherical electrodes about 20 mm in diameter (one electrode under tension and the other connected to earth) and a dielectric oil sold by the company Bluestar Silicones under the reference Rhodorsil 604 V 50. By definition, the dielectric breakdown strength is the ratio between the breakdown voltage and the thickness of the insulator. The breakdown voltage was measured at about 24° C., with a humidity of about 50%, using the stepped voltage climb method. The applied voltage was an alternating voltage with a frequency of about 50 Hz and the voltage step-up rate was about 1 kV's to the point of breakdown. 12 measurements were taken for each non-crosslinked layer.

The tangent delta (tan δ) (or loss factor) of the layers as prepared above was measured by dielectric spectroscopy using a machine sold under the trade name Alpha-A by the company Novocontrol Technologies.

The tangent of the loss angle gives an indication regarding the energy dissipated in a dielectric in the form of heat.

The tests were performed on layers with a thickness close to 0.5 mm at 90° C., at a frequency of 40 to 60 Hz with a 500 V voltage adapted according to the thickness of the test sample, so as to apply an electric field of 1 kV/mm.

4. Results

The layer obtained from composition I1 showed no whitening, whereas the layer obtained from the comparative composition C1 was revealed to be sparingly resistant since a white mark at the bend appeared immediately when the manual stress was applied.

The dielectric breakdown strength and loss factor results are presented in table 2 below:

TABLE 2

| | Dielectric breakdown strength (kV/mm) | Tangent delta at 90° C. |
|---|---|---|
| C1 | 129.25 | $7.5 \times 10^{-5}$ |
| I1 | 127.11 | $8.2 \times 10^{-5}$ |

Consequently, the polymer compositions according to the invention have better properties in terms of stress whitening resistance while at the same time ensuring good dielectric properties.

The invention claimed is:

1. A polymer composition comprising at least one polypropylene-based thermoplastic polymer material and a dielectric liquid, wherein the dielectric liquid comprises at least one compound corresponding to formula (I) below:

$$R^1\text{-}A\text{-}R^2 \qquad (I)$$

in which $R^1$ and $R^2$, identical or different, are unsubstituted aryl groups and the element A represents a single bond or an alkylene group, wherein the polypropylene-based thermoplastic polymer material comprises at least one homopolymer or one copolymer of propylene $P_1$, and at least one homopolymer or one copolymer of α-olefin $P_2$.

2. The polymer composition according to claim 1, wherein the aryl group comprises from 5 to 20 carbon atoms.

3. The polymer composition according to claim 1, wherein the element A is an alkylene group containing from 1 to 10 carbon atoms.

4. The polymer composition according to claim 3, wherein the alkylene group is a group —$(CH_2)_n$— with $1 \leq n \leq 10$; a group —$(CHR)_n$— with $1 \leq n \leq 5$ and R being an alkyl group; a statistical group —$(CHR)_p$—$(CH_2)_m$—, with $1 \leq p+m \leq 9$, and R being an alkyl group; or a statistical group —$(CHR)_{p1}$—$(CH_2)_{m'}$—$(CHR')_{p2}$—, with $1 \leq p_1+m'+p_2 \leq 8$, and R and R' being different alkyl groups.

5. The polymer composition according to claim 1, wherein at least one of said groups $R^1$ or $R^2$ of the compound of formula (I) is a phenyl group.

6. The polymer composition according to claim 1, wherein the compound of formula (I) is diphenylethane, diphenylmethane or 1,2,3,4-tetrahydro(1-phenylethyl)naphthalene.

7. The polymer composition according to claim 1, wherein the dielectric liquid comprises at least 50% by mass of at least one compound of formula (I), relative to the total mass of the dielectric liquid.

8. The polymer composition according to claim 1, wherein the ratio of the number of aromatic carbon atoms to the total number of carbon atoms in the dielectric liquid is greater than or equal to 0.6.

9. The polymer composition according to claim 1, wherein the dielectric liquid represents from 1% to 20% by mass relative to the total mass of the polymer composition.

10. The polymer composition according to claim 1, wherein the propylene copolymer $P_1$ is a copolymer of propylene and ethylene.

11. The polymer composition according to claim 10, wherein the propylene homopolymer or copolymer $P_1$ represents from 40% to 70% by mass of the polypropylene-based thermoplastic polymer material.

12. The polymer composition according to claim 10, wherein the α-olefin homopolymer or copolymer $P_2$ is a heterophasic copolymer comprising a thermoplastic phase of propylene type and a thermoplastic elastomer phase of the type copolymer of ethylene and of an α-olefin, a polyethylene or a mixture thereof.

13. The polymer composition according to claim 10, wherein the α-olefin homopolymer or copolymer $P_2$ represents from 30% to 60% by mass of the thermoplastic polymer material.

14. A process for preparing the polymer composition as defined in claim 1, comprising at least one step i) of mixing a polypropylene-based thermoplastic polymer material with said dielectric liquid.

15. A cable comprising at least one elongated electrically conducting element, and at least one electrically insulating layer obtained from a polymer composition as defined in claim 1.

16. The cable according to claim 15, wherein the electrically insulating layer is a non-crosslinked layer.

17. A process for manufacturing an electric cable as defined in claim 15 said process comprising at least one step 1) of extruding the polymer composition around an elongated electrically conducting element, to obtain an electrically insulating layer surrounding said elongated electrically conducting element.

* * * * *